(No Model.)

J. D. SCHOFIELD.
CORN PLANTER.

No. 446,118. Patented Feb. 10, 1891.

Witnesses
Jas. R. McLathran
Wm. Bagger

By his Attorneys,
C. A. Snow & Co.

Inventor
Jas. D. Schofield

UNITED STATES PATENT OFFICE.

JAMES DROMMOND SCHOFIELD, OF ROGERS, TEXAS, ASSIGNOR TO THE OHIO CULTIVATOR COMPANY, OF BELLEVUE, OHIO.

CORN-PLANTER.

SPECIFICATION forming part of Letters Patent No. 446,118, dated February 10, 1891.

Application filed August 9, 1890. Serial No. 361,570. (No model.)

*To all whom it may concern:*

Be it known that I, JAMES DROMMOND SCHOFIELD, a citizen of the United States, residing at Rogers, in the county of Bell and State of Texas, have invented a new and useful Corn-Planter, of which the following is a specification.

This invention relates to seeders and planters, and more particularly to that class of machines which may be used interchangeably for planting corn and cotton-seed.

The present improvements relate more particularly to an improved cut-off to be used in connection with that part of the machine which is used for planting corn; and it has for its object to provide a device of this class which shall be simple, durable, and efficient in operation, and which shall serve not only to prevent too large quantities of seed from entering the seed-cups, but which shall also serve to forcibly eject the seeds at the proper time, all in a manner which will be hereinafter fully described, and particularly pointed out in the claims.

Figure 1:
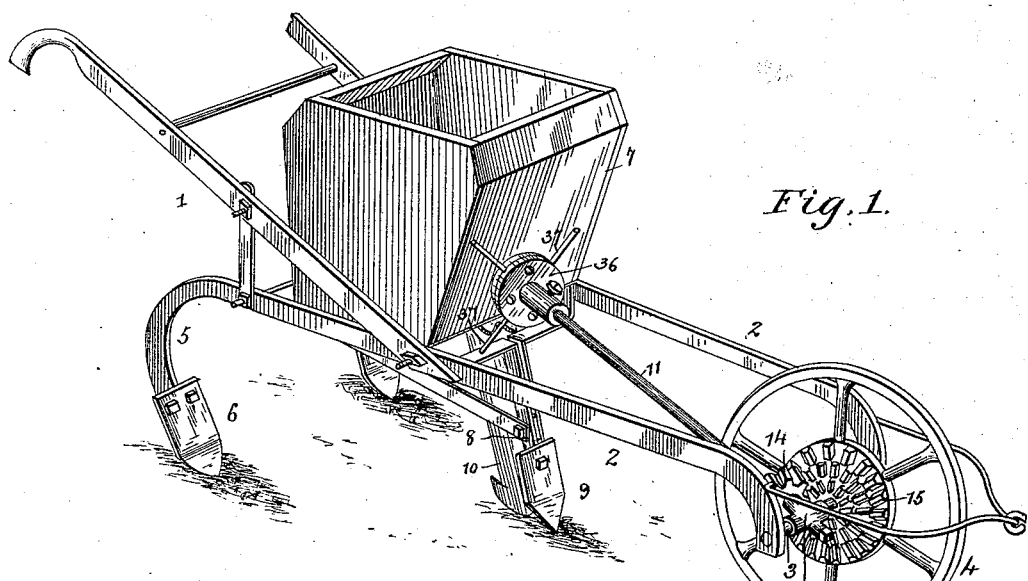
Figure 2:
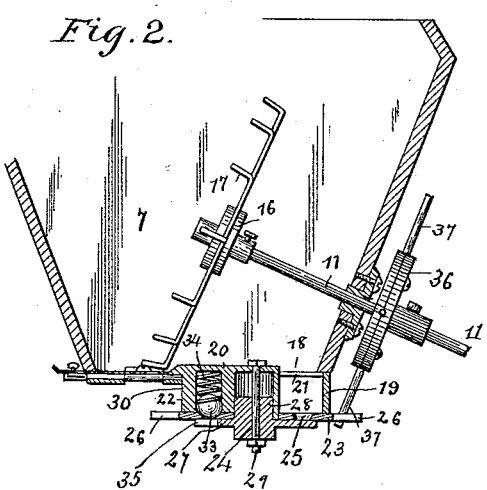
Figure 3:
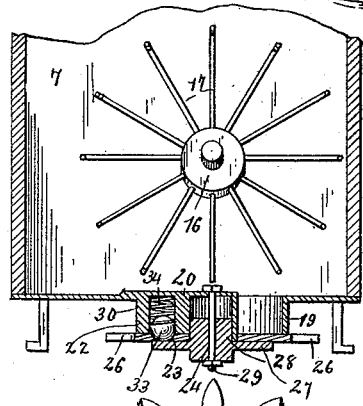
Figure 4:
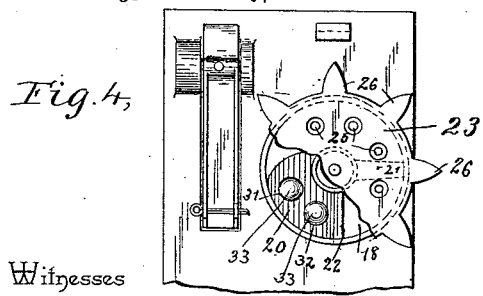
Figure 5:
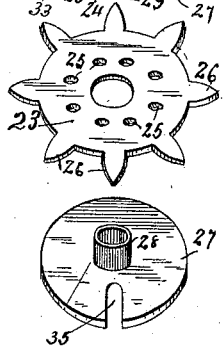

In the drawings hereto annexed, Figure 1 is a perspective view of a seed-planter embodying my improvements. Fig. 2 is a longitudinal sectional view taken through the hopper of the machine. Fig. 3 is a transverse sectional view taken through the hopper. Fig. 4 is a bottom plan view, the bottom supporting-plate having been removed for the purpose of showing the construction more clearly. Fig. 5 is a perspective detail view showing the several parts comprising my invention separated from each other.

Like numerals of reference indicate like parts in all the figures.

1 designates the frame of the machine, the side beams of which, 2 2, are connected at their front ends by a transverse shaft 3, upon which the driving-wheel 4 is journaled. The rear ends of the side beams 2 are curved downwardly, so as to form the standards 5, to which the covering-plows 6 are attached. The hopper 7 is suitably mounted upon the frame of the machine, and underneath the said hopper is arranged a standard 8, to the lower end of which the furrow-opener 9 is secured. The feed-tube 10 is attached to the rear side of the standard 8 to convey the seeds from the hopper to the ground.

11 designates an inclined shaft, the front end of which has a bearing in a collar 13, suitably mounted upon the transverse shaft or axle 3. The rear end of the shaft 11 is journaled in the front wall of the hopper. At or near its front end the shaft 11 carries a bevel-pinion 14, meshing with bevel-gear 15 upon one side of the drive-wheel. The rear end of the shaft 11 carries within the hopper a hub 16, having radiating arms 17, which are principally useful when the device is used for planting cotton-seed. At other times, however, they will also be found useful for the purpose of agitating the contents of the hopper.

The bottom of the hopper is provided with a circular opening 18, surrounded by a downwardly-extending annular flange 19. Suitably secured in the bottom of the hopper above the opening 18 is a segmental plate 20, having an arm 21, which extends diametrically across the said opening 18 and is provided with a downwardly-extending circular flange or casting 22, which is concentric with the flange 19.

23 designates the seed-plate, which consists of a circular plate having a central perforation 24, whereby it is journaled upon the bushing 22. The seed-plate is provided with a circumferential series of perforations or seed-cups 25 and with a corresponding number of outwardly-extending spurs or teeth 26.

27 designates the bottom or supporting plate, which is provided with a central collar 28, adapted to fit in the bushing 22, through which and the said bottom plate a bolt 29 extends to connect the parts separately together.

In the circular opening in the bottom of the hopper underneath the plate 20 and between the branch 19 and the bushing 22 is arranged a segmental block 30, which is provided with two vertical cylindrical sockets or recesses designated, respectively, by 31 and 32. In each of these sockets is arranged a ball 33, and between the said balls and the tops of said sockets are placed springs 34, which shall serve to force the said balls in a downward direction into contact with the seed-plate. The balls 33 are placed in alignment with the openings or seed-cups 25 in the seed-plate, and the relative sizes of said balls and openings is to be such that while the said balls will partly enter the said openings they will under no circumstances pass through the same.

The bottom plate 27 is provided at its periphery with a notch 35, which is located directly under the recess or socket 32, in which the ejector-ball 33 is located, and said socket and notch are also to be in alignment with the seed-tube of the machine.

The inclined shaft 11 is provided directly in front of the hopper 7 with a hub 36, having a series of radial arms or tappets 37, which are preferably mounted adjustably in the said hub, in order that the distance between the hills may be regulated, which is done by simply adjusting the said arms or tappets any desired distance apart. Said arms or tappets will engage the teeth or spurs 26, which extend radially from the seed-wheel, and which project slightly below the lower front edge of the hopper, so that as the shaft 11 revolves an intermittent rotary motion will be imparted to the said seed-tube.

The operation of my invention will be readily understood from the foregoing description, taken in conection with the drawings hereto annexed. The seed which is placed in the hopper will pass down between the flange 19 and bushing 22 and rest upon the seed-plate 23. As the latter revolves, the cups or openings 25 become filled with the seed; but any superfluity of the latter is removed by the cut-off ball seated in the socket 31. The seed-cups, as they pass in succession under the ball seated in the socket 32, are engaged and their contents quickly ejected by the action of the said ball.

It will be particularly noted that by the arrangement of the two balls, one serving as a cut-off and the other as an ejector, the purposes of the invention are accomplished in an exceedingly thorough and satisfactory manner and with the least possible degree of frictional resistance. For this reason my improved planter may be operated very easily and is less subject to wear and tear than most planters of ordinary construction.

I am aware that weighted and spring-actuated wheels or pulleys have been used for cut-off and ejecting purposes in machines of this class. This is objectionable, because it involves a vertical sliding movement of the shanks to which such wheels are pivoted, and such construction I disclaim.

Having thus described my invention, what I claim is—

1. In a seed-planter having a rotary seed-plate, the combination, with the latter, of loose spherical weights or balls arranged concentrically with the axis of said seed-disk and serving, respectively, to cut off and to eject the seed from the seed-cups, and springs resting loosely on top of balls to force them in a downward direction, substantially as set forth.

2. In a seed-planter having a rotating seed-disk, the combination, with the latter, of a block having vertical sockets aligning with the seed-cups in said disk, the balls mounted loosely in said sockets and engaging the seed-cups and serving, respectively, to cut off and to eject the seed from said seed-cups, and springs arranged to force the said balls in a downward direction, substantially as and for the purpose set forth.

3. In a seed-planter, the combination of the hopper, the bottom of which is provided with a circular opening having a downwardly-extending annular flange and a central bushing, the rotating seed-plate mounted upon the latter, the bottom plate having a collar extending into the bushing, the connecting-bolt, the sockets arranged above the seed-plate, the balls mounted in said sockets, and a spring arranged above one of said balls or valves, substantially as and for the purpose set forth.

4. In a seed-planter, the combination of the hopper, the bottom of which is provided with a circular opening, a downwardly-extending annular flange, and a central bushing, the seed-plate journaled upon the latter, the bottom plate having a peripheral notch and provided with a collar engaging the central bushing, the connecting-bolt, the sockets arranged above the rotating seed-plate, and the balls mounted in said sockets, substantially as and for the purpose set forth.

5. In a seed-planter, the combination of the hopper, the intermittently-rotating seed-plate having a circumferential series of perforations or seed-cups, the segmental plate secured to the bottom of the hopper and having a radial arm, the segmental block arranged below said plate and above the seed-plate and having vertical cylindrical sockets, the balls mounted in said sockets, and the spring arranged in one of said sockets above the ball, all arranged and operating substantially as and for the purpose herein set forth.

In testimony that I claim the foregoing as my own I have hereto affixed my signature in presence of two witnesses.

JAMES DROMMOND SCHOFIELD.

Witnesses:
G. N. GIVENS,
S. B. STAR.